(12) United States Patent
Pieda et al.

(10) Patent No.: US 6,882,627 B2
(45) Date of Patent: Apr. 19, 2005

(54) METHODS AND APPARATUS FOR SELECTING MULTIPLE PATHS TAKING INTO ACCOUNT SHARED RISK

(75) Inventors: Peter Steven Pieda, Kanata (CA); Walter Joseph Carpini, Stittsville (CA); Cuong Tu Dang, Ottawa (CA); Kelvin Ross Edmison, Ottawa (CA); Udo Mircea Neustadter, Carp (CA)

(73) Assignee: Tropic Networks, Kanata (CA)

( * ) Notice: Subject to any disclaimer, the term of this patent is extended or adjusted under 35 U.S.C. 154(b) by 854 days.

(21) Appl. No.: 09/879,937

(22) Filed: Jun. 14, 2001

(65) Prior Publication Data

US 2002/0191545 A1 Dec. 19, 2002

(51) Int. Cl.$^7$ .................................................. H04J 1/16
(52) U.S. Cl. ...................................... 370/248; 709/239
(58) Field of Search ................................ 370/216, 217, 370/219–221, 225, 227, 229, 351, 248, 249; 709/238, 241

(56) References Cited

U.S. PATENT DOCUMENTS

| | | | | | |
|---|---|---|---|---|---|
| 4,999,829 | A | * | 3/1991 | Fite et al. | 370/218 |
| 5,058,105 | A | * | 10/1991 | Mansour et al. | 370/228 |
| 6,047,331 | A | * | 4/2000 | Medard et al. | 709/239 |
| 6,141,319 | A | | 10/2000 | Dighe et al. | |

FOREIGN PATENT DOCUMENTS

WO    WO 01/39437 A2    5/2001

OTHER PUBLICATIONS

Torrieri, D., "Algorithms for Finding an Optical Set of Short Disjoint Paths in a Commonwealth Network", IEEE Transactions on Communications 40 (1992), Nov., No. 11, New York, US.
Survivable Networks: Algorithms for Diverse Routing, Ramesh Bhandari, Ph.d., Kluwer Academic Publishers, 1999, pp. 1, 2, 46 to 53, 64 to 70, 79 to 85 and 93 to 115.
"Inference of Shared Risk Link Groups", D. Papadimitriou, et al., Feb. 2001, http://search.ietf.org/internet–drafts/draft–many–inference–srlg–00.txt, printed Jun. 20, 2001, pp. 1 to 24.

* cited by examiner

*Primary Examiner*—Wellington Chin
*Assistant Examiner*—Brenda Pham
(74) *Attorney, Agent, or Firm*—Victoria Donnelly

(57) ABSTRACT

Methods, systems, computer readable media are provided which facilitate the selection of multiple paths through a network represented by a network topology which take into account shared risk which may exist between network resources. The method involves identifying a first path through the network topology from a source node to a destination node, the first path comprising a first sequence of network resources. For at least one shared risk group, a determination is made if any of the at least one shared risk group includes any of the first sequence of network resources, a shared risk group being a group of network resources within the network topology which have a shared risk. A topology transformation is performed of the network topology into a virtual topology which discourages the use of network resources in any shared risk group determined. A second path through the virtual topology is identified from the source node to the destination. The method may be adapted to encourage node and/or edge disjointness.

30 Claims, 9 Drawing Sheets

METHODS AND APPARATUS FOR SELECTING MULTIPLE PATHS TAKING INTO ACCOUNT SHARED RISK

FIELD OF THE INVENTION

The invention relates to networks, such as communications networks, and more particularly to methods and apparatus for selecting multiple paths through such networks.

BACKGROUND OF THE INVENTION

As is known in the art, a network includes a set of processing sites generally referred to as stations or nodes connected by one or more physical and/or logical connections generally referred to as links, which may be unidirectional or bi-directional in nature. Each node typically performs a switching function and one or more additional functions.

The nodes may be coupled together in a variety of different network structures typically referred to as network topologies. For example, network nodes made be coupled in a circular structure, referred to as a ring topology. Other topologies such as star topologies and mesh topologies are also known.

The transmission of a signal from a first or source node to a second or destination node may involve the transmission of the signal through a plurality of intermediate links and nodes coupled between the source node and the destination node. Such a succession of links and nodes between a source node and a destination node is referred to as a path.

When a link or node in a path fails, communication between a source node and a destination node in that path is disrupted. Thus, to continue communications between the source and destination nodes, another path must be found and the signal being transmitted from the source node to the destination is routed through the new path. This path determination can be a complex time intensive operation resulting in a long delay before the disrupted communications are fixed. The magnitude of this process increases greatly with network topology size.

One approach to providing failure tolerance in such networks is to identify during initial service configuration a primary path through the network and one or more non-primary paths or protection paths through the network simultaneously, so-called "multi-path routing". For example, methods are available of identifying two paths such that they are maximally edge disjoint, meaning that the two paths share as few links as possible—usually no links, and methods are available of identifying two paths such that they are maximally node disjoint, meaning that the two paths share as few nodes as possible—usually no nodes. Once a failure (link or node) occurs, the signals are automatically switched or protection switched on these protection path(s) drastically reducing disruption time. Thus, ensuring edge/node resource disjointness is important.

Some links and/or nodes in a network may share common risk of failure. For example, there may be multiple links which at some point share a common resource such as a common single cable. Such links would simultaneously fail in the event of the failure of the common resource. Groups of network resources which share common risks are referred to herein as "shared risk groups" or SRGs. Existing route definition methods such as the above-noted maximally disjoint approaches do not address the issue of shared risk groups, resulting in the possibility that the primary and non-primary paths will share some resources even though they do not share any links and/or nodes.

SUMMARY OF THE INVENTION

A methods, systems, computer readable media are provided which facilitate the selection of multiple paths through a network represented by a network topology which take into account shared risk which may exist between network resources.

A first broad aspect of the invention provides a method of selecting multiple paths through a network represented by a network topology representing an interconnected set of network resources. The method involves identifying a first path through the network topology from a source node to a destination node, the first path comprising a first sequence of network resources; for at least one shared risk group, determining if any of the at least one shared risk group includes any of the first sequence of network resources, a shared risk group being a group of network resources within the network topology which have a shared risk; performing a SRG (shared risk group) topology transformation of the network topology into a virtual topology which discourages the use of network resources in any shared risk group determined in step b); and identifying a second path through the virtual topology from the source node to the destination node, the second path comprising a second sequence of network resources.

The network resources might for example include nodes and links. The shared risk groups might include groups of nodes and/or groups of links.

Preferably, the SRG topology transformation for each node requiring SRG transformation involves transforming the node requiring transformation into two interconnected nodes, providing a forward unidirectional link between the two interconnected nodes, and assigning the forward unidirectional link a cost, transforming any bi-directional link into the node requiring transformation into a first unidirectional link into one of the two interconnected nodes, and a second unidirectional link out of the other of the two interconnected nodes.

Preferably, the cost assigned to each forward unidirectional link is greater than a sum of costs for all links in the network topology.

The SRG topology transformation for each link requiring transformation preferably involves transforming the link requiring transformation into a forward unidirectional link and a reverse unidirectional link each having a respective cost. For each unidirectional link, preferably, a respective cost is assigned which is larger than a sum of the costs assigned to all links in the topology. Preferably, a larger cost is assigned to transformed links which form part of the first path than for transformed unidirectional links which do not form part of the first path.

In another broad aspect, the method further involves transforming the network topology in a manner which also encourages node and or edge disjointness.

The method preferably further involves identifying if there are any unnecessary shared links between the first and second path, and in the event there are unnecessary shared links between the first and second paths, performing a path coalescence to eliminate the unnecessary shared links.

Furthermore, the method may involve, in the event at least two paths cannot be found which do not share at least one resource having shared risks, revising the at least one shared risk group to be less restrictive and then re-executing the method.

This may be done for example by defining a hierarchy of resources, the hierarchy having a plurality of levels, with resources assigned to a given level in the hierarchy being contained by a resource assigned to a higher level in the hierarchy, wherein a shared risk between any two resources in a lower level of the hierarchy is also considered a shared risk between any pair of resources in a higher level of the hierarchy which contain the two resources the lower level of the hierarchy. A first attempt is made to define first and second paths which do not share any risk at the highest level of the hierarchy of resources. Upon failure of the first attempt, at least one subsequent attempt is made to define first and second paths which do not share any risk at a level of the hierarchy of resources below the highest level of the hierarchy of resources. Subsequent attempts are made for respective lower levels of the hierarchy of resources until first and second paths are identified which do not share risk at the respective lower level.

Another broad aspect of the invention provides a processing platform readable medium having instructions stored thereon for allowing a processing platform, specific or nonspecific, to implement any of the methods described herein.

Another broad aspect of the invention provides a network management platform adapted to implement any of the methods described herein. This would include any suitable combination of hardware and/or software.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

A shared risk group consists of a group of resources used in a network which share at least common risk. Such risk might be associated with sharing a common resource, for example line cards, network nodes, fiber cable, conduit containing fiber cabling and trenches. Such risk might also be associated with sharing common geographical location, for example as is the case for the resources in a captive office which would be geographically co-located.

Figure 1:
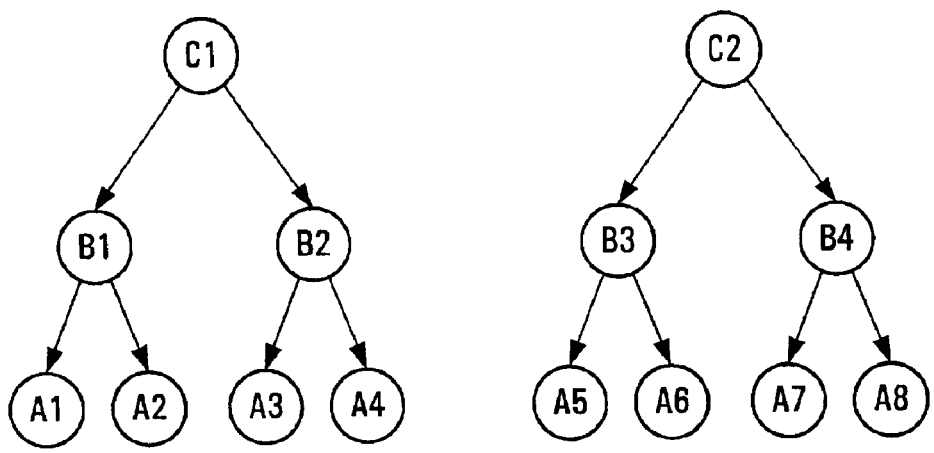
FIG. 1 is a pictorial example of hierarchical groupings.

In a preferred embodiment of the invention, shared risk is viewed in a hierarchical manner. A shared risk hierarchical grouping will be described with reference to an example of FIG. 1. In this example, a three-level hierarchical grouping is shown in which there are three resource types, level one resource type A, level two resource type B and level three resource type C, with eight resources of type A labelled A1, . . . , A8, four resources of type B labelled B1, B2, B3, B4 and two resources of type C labelled C1, C2. Each resource of type A is contained in a resource of type B, each resource of type B is contained in a resource of type C. A shared risk between any two resources in a lower level of the hierarchy is also considered a shared risk between any pair of resources in a higher level of the hierarchy which contain the two resources the lower level of the hierarchy. For example, if resources A1 and A3 share risk, then so do resources B1 and B2. In a preferred embodiment of the invention, as detailed below, paths are selected to avoid the sharing of any risk at the highest level in the hierarchy. If that is not possible, then paths are selected to avoid the sharing of any risk at the second highest level in the hierarchy, and so on.

An example of hierarchical groupings provided by a preferred embodiment of the invention will be described in the context of an optical network. However, the invention may be applied to any type of network.

The following are specific examples of shared risk groups which might exist in an optical network:

Shared Risk CO Group (SRCOG)—identifies an aggregation of network nodes in one central office.

Shared Risk Node Group(SRNG)—identifies network nodes in which a lambda traverses from start to end.

Shared Risk Line Card Group (SRLCG)—at a minimum, one lambda is associated with two Card IDs, but the actual number of SRLCGs per lambda is only bounded by physical SONET requirements.

Shared Risk Trench Group (SRTG)—identifies the common location of fiber optic conduits.

Shared Risk Conduit Group (SRCG)—identifies the fibers (lambdas) associated with a single conduit.

Shared Risk Fiber Group (SRFG) identifies fiber, lambdas sharing the same fiber.

For the optical networking example, two risk hierarchies can be defined, and these will be referred to as the physical hierarchical grouping and link hierarchical grouping and are defined as follows:

Physical Hierarchical Grouping is comprised of level 1=captive office>level 2=network node>level 3=line card;

Link Hierarchical Grouping is comprised of level 1=trench>level 2=conduit>level 3=fiber.

A shared risk group constraint is defined as a routing constraint introduced which limits the sharing of resources which are in an SRG between primary and non-primary paths. Such SRG constraints can occur at level 1 hierarchy (captive office or Trench), level 2 hierarchy (network node or conduit) or level 3 hierarchy (Line card or Fiber).

The objective of multi-path SRG-constrained routing is to identify multiple paths with minimum intersecting shared risk groups. Below, a detailed description of a method of identifying paths which are SRG-constrained is provided. Sometimes, it is not possible to identify two (or more) paths which satisfy a given set of SRG constraints, and in such a situation, it is necessary to change, or evolve the SRG constraints in order to make another attempt to identify paths. Many such SRG constraint evolutions may be employed.

Furthermore, most of the constraints are subject to exception. For example, a SRNG constraint would avoid using common nodes in the primary path and the non-primary path. However, some network topologies may require all paths from a source to a destination to pass through one or more common resources, such as a gateway node for example.

The constraints typically include an initial set of constraints, and subsequent sets of constraints or rules for the definition of subsequent sets of constraints which are to be applied to minimize exposure to SRG in the event it is not possible to find the required multiple paths satisfying the initial set of constraints. The sequence of sets of constraints applied need not follow any particular pattern/rules. However, in a preferred embodiment, an approach based on the above discussed hierarchical groupings is employed as described below.

In a preferred embodiment of the invention, the SRG constraints are applied hierarchically for a constraint hierarchy which starts with a most strict constraint followed by a sequence of less strict constraints. For the example above, the hierarchical application can be applied for the physical and link SRG hierarchical groupings. For example, the initial constraint might be to find primary and non-primary paths based upon the highest level of SRG (level 1) in one or more SRG hierarchies. For the link hierarchy, this would involve avoiding the selection of two paths which share any trenches. If the search is made, and the best two paths determined still share resources within the same shared risk group, and therefore are not shared risk group disjoint, then paths that meet the specified criteria could not be determined. If this occurs, then a search is made for two paths which has constraints based upon the next highest level of SRG (level 2). For the link hierarchy, this would involve avoiding the selection of two paths which share any conduits. If that is not possible, then a search is made for the paths which has the constraints based upon the next level (level 3) and so on. For the link hierarchy example above, this would involve avoiding the selection of two paths which share any fibers.

Similarly, for the hierarchical approach applied to the physical hierarchical grouping, if two paths which are SRCOG disjoint cannot be found, then an attempt to find two paths which are SRNG disjoint is made. If such paths cannot be found, then an attempt to find two paths which are SRLCG disjoint is made.

Multi-Path SRG-Constrained Routing Algorithm

Figure 2:
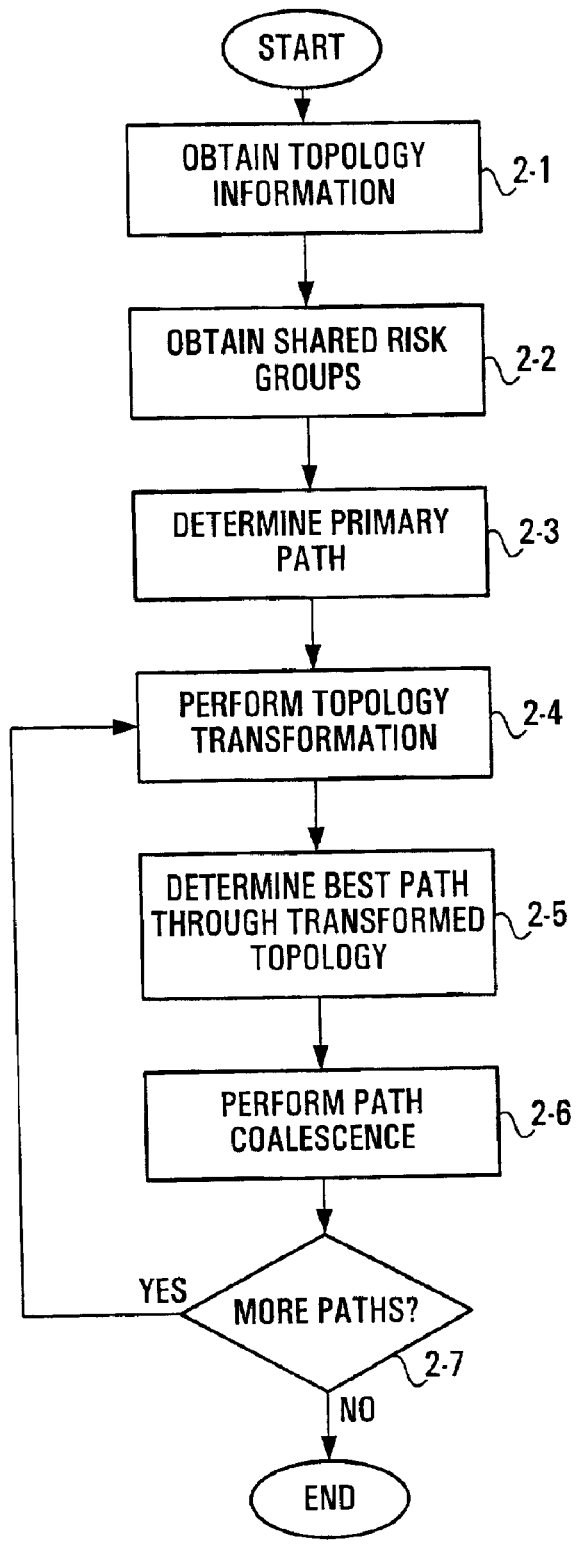
FIG. 2 is a flowchart of a method of identifying multiple paths through a network provided by an embodiment of the invention.

Referring to the flowchart of FIG. 2, the multi-path SRG-constrained routing algorithm has the following steps:
a) obtain topology information (step 2-1);
b) obtain shared risk groups (step 2-2);
c) determine primary path, using any suitable routing approach (for example multiple constraint routing (MCR), best path in network, minimum hop, etc.) (step 2-3);
d) create a transformed topology in which the resources of each shared risk group including a resource in the primary path are transformed—topology transformation (step 2-4);
e) determine non-primary path to be the best path through this transformed topology (step 2-5);
f) examine the primary and non-primary paths to determine necessary and unnecessary common links—path coalescence (step 2-6).

In the event further paths are required (yes path, step 2-7), then the method continues back at step 2-4 with a further topology transformation in which shared risk groups which include any resources of previously identified paths are transformed.

Each of these steps will now be described in further detail with reference to an example network topology of FIG. 3A.

a) Obtain Topology Information

Topology information is typically maintained by all nodes in the network. Routing protocols such as OSPF (open shortest path first) or BGP (border gateway protocol) may be used to provide topology information. The topology information provides an identification of the physical and link resources of a network and their interconnections. It may be maintained in a hierarchical manner in which case the physical resources (e.g. captive office, node, line card) are identified hierarchically, and in which the connectivity is also maintained hierarchically such that a link between two line cards will also be a link between the two nodes containing the line cards, and will also be a link between the two captive offices containing the two nodes. The topology information also includes a cost associated with each link. For the purpose of this description, this cost may be any single or aggregate cost associated with each link, for example, but not limited to financial cost, geographical distance, bandwidth, utilization, available bandwidth, reserved bandwidth, jitter, delay.

Figure 3A:
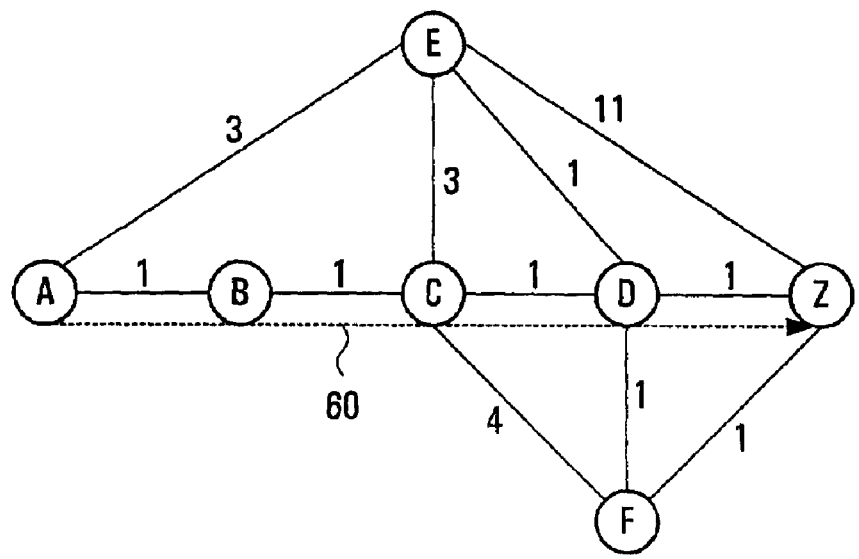
FIGS. 3A–3D are network topologies illustrating use of the method of FIG. 2 for shared risk group constraint based routing.

A pictorial example of a network topology is shown in FIG. 3A. In this example, shown are seven nodes labelled A, B, C, D, E, F, Z, and there are links identifiable by the two nodes each link connects, namely AE(3), AB(1), BC(1), CD(1), CF(4), DZ(1), DF(1), EC(1), ED(3), EZ(11), FZ(1), the numbers in parenthesis indicating a cost associated with each link.

b) Obtain Shared Risk Groups

As indicated previously, the shared risk groups which are considered during path identification may change during several iterations of the method. In a first iteration, preferably level 1 shared risk groups are identified. In subsequent iterations, preferably lower level shared risk groups are identified.

For the purpose of this example, it is assumed that shared risk node groups and shared risk conduit groups are to be considered. In the pictorial example of FIG. 3B for the iteration of the method in question, it is assumed that there is a first shared risk conduit group 50 consisting of links AE and AB, a second shared risk conduit group 52 consisting of links DZ and FZ, and a shared risk node group 54 consisting of nodes E and C.

c) Determine Primary Path, Using Any Suitable Routing Approach

The details of the determination of a particular path through a network topology are beyond the scope of this invention. Any suitable method may be used. Typically, the selected path is that with the lowest cost, the cost of a particular path being the sum of the costs on the links making up the path. For the purpose of our example topology, we assume A is the source node, and Z is the destination node, and the primary path 60 consisting of links AB, BC, CD, DZ is identified, as shown in FIG. 3A.

d) Create a Transformed Topology in which the Resources of Each Shared Risk Group Including a Resource in the Primary Path Are Transformed—Topology Transformation The links and nodes of shared risk groups under consideration for this transformation are only those shared risk groups which include at least one link/node in the primary path. The network has its links and nodes along the primary path belonging to such shared risk groups transformed to discourage their use. The transformation is done to maximally discourage use of the SRG resources in the non-primary path, however, a non-primary path SRG resource is used over a primary path resource, when no alternatives are available.

Link Transformation

Figure 4A:
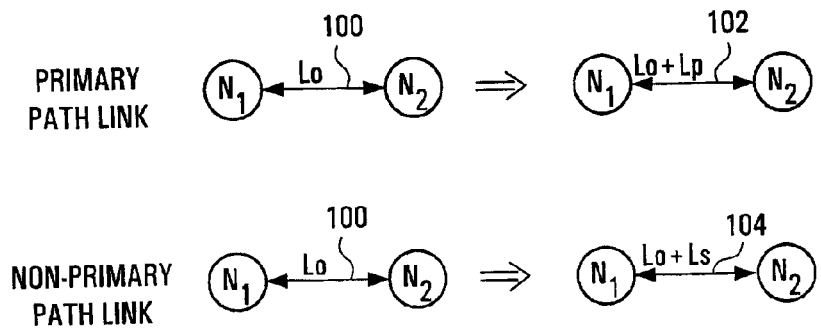
FIGS. 4A and 4B provide a summary of node and link transformations for shared risk groups, provided by an embodiment of the invention.

A preferred method of performing link transformation will be described with reference to FIG. 4A. Each primary bi-directional intermediate link L 100 belonging to an SRG group under consideration is transformed into a link L' 102. Similarly, each non-primary bi-directional intermediate link L 100 belonging to an SRG group under consideration is transformed into a link L' 104. For non-primary path links, each link L' 104 is assigned a cost of Lo+Ls, where Lo=original link cost, Ls=(Slinkcosts)*SRLG, where Slinkcosts is arbitrarily defined to be the sum of the costs of all of the links in the network. For primary path links, each link L' 102 is assigned a cost Lo+Lp, Lp=(Slinkcosts)*SRLG+K. Note, Lp>Ls by an amount K, as using a primary link in an SRG is worse than using a non-primary in an SRG.

Node Transformation

A preferred method of performing node transformation will be described with reference to FIG. 4B. Each node N 120 to be transformed is split into two nodes N' 122, N" 124. For a primary path node, a new unidirectional link N'→N" 126 is added, and for a non-primary path node, a new unidirectional link N'→N" 128, in both cases between the two new nodes 122,124. The links 126,128 have costs defined as follows:

non-primary path node N'→N": cost=Cs=(Slinkcosts)*SRNG primary path node N'→N": cost=Cp=(Slinkcosts)*SRNG+J The primary path node has a higher cost by an amount J to discourage its use over the non-primary path node.

Figure 4B:
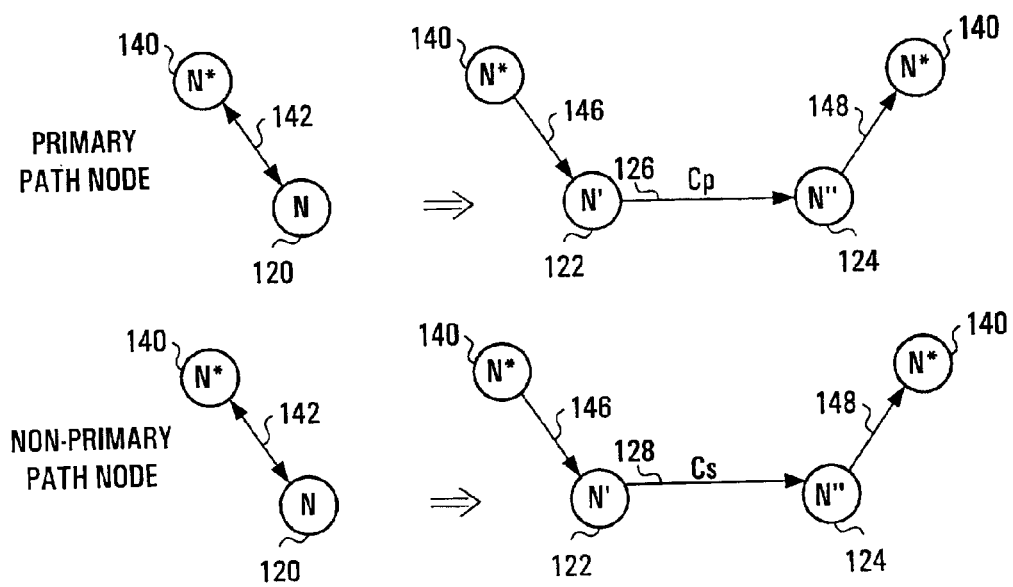

Any bi-directional link 142 from another node, referred to as node N* 140 in FIG. 4B, to a transformed node N is split into two links, N"—N* 148 and N* to N' 146 each having a cost equal to the original cost of the single bi-directional link. This is the same for both primary path and non-primary path nodes.

In the above example, the costs added to the links and nodes are set equal to Slinkcosts*SRLG and Slinkcosts*SRNG respectively, where Slinkcosts is the sum of all the link costs in the network under consideration. SRLG and SRNG might for example be set equal to four. This is an example cost only, and the costs do not need to be equal. For example to discourage link shared risk group disjointness even more than node shared risk group disjointness, one could set SRLG to be a larger value than SRNG.

Figure 3B:
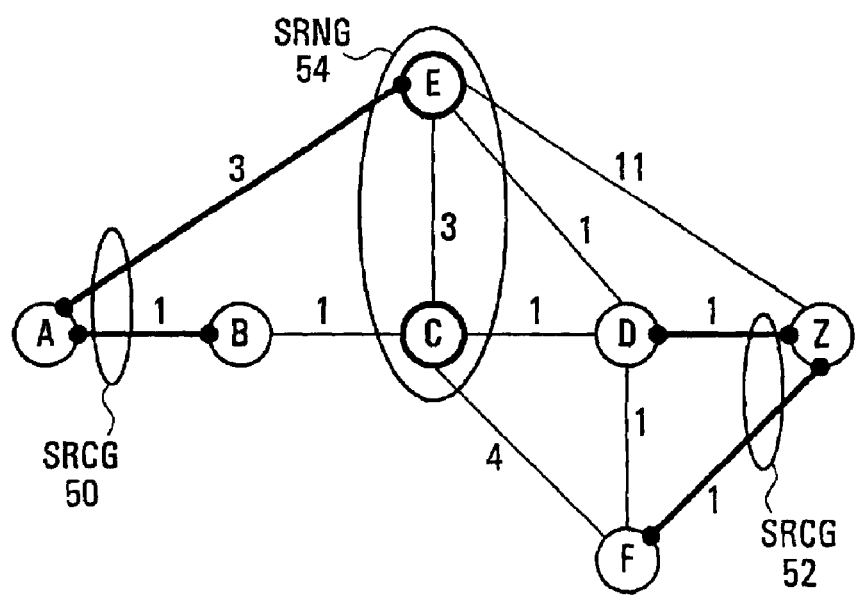
Figure 3C:
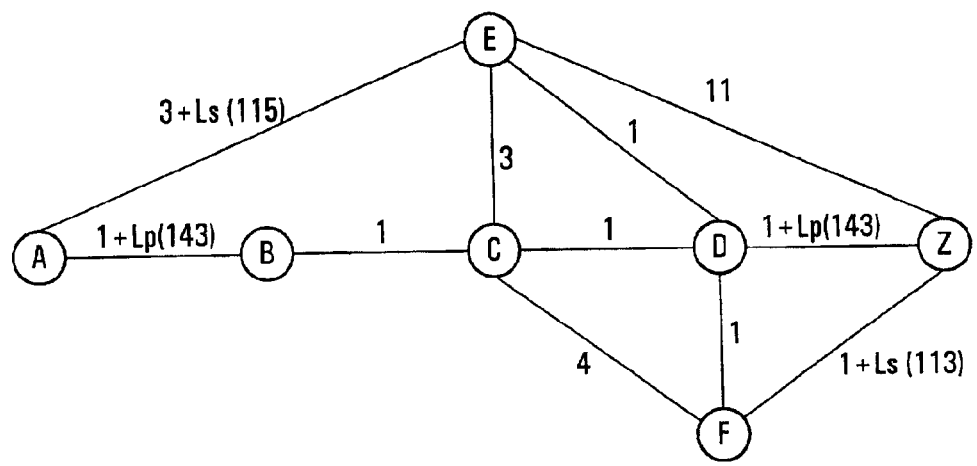

Returning now to our example network, FIG. 3C shows the network of FIG. 3A after the SRCGs 50,52 identified in FIG. 3B have been transformed using the above-discussed link transformation. For the purpose of our example, values of SRLG=4, and K=30 are assumed, leading to Ls=4×(Slinkcosts=28)=112, and Lp=4×28+30=142. The resulting link costs are indicated in parenthesis in FIG. 3C.

Figure 3D:
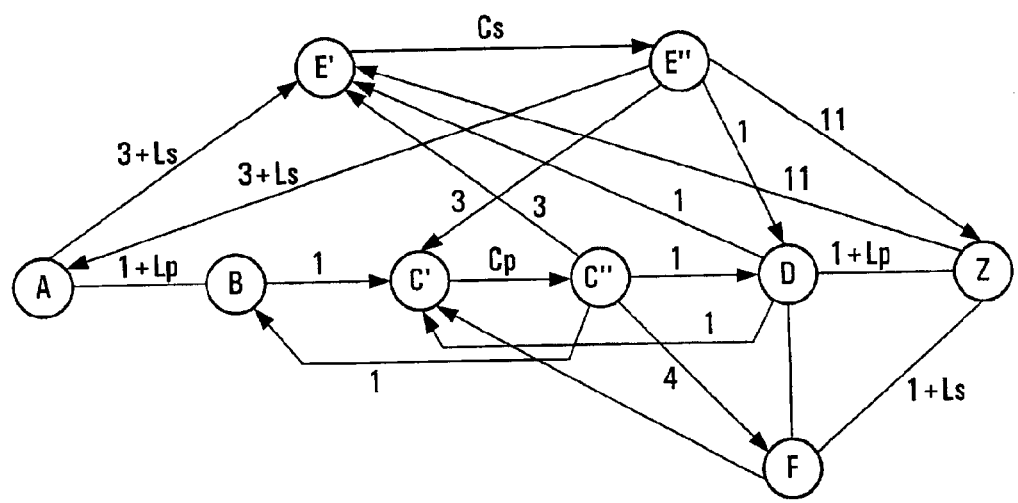

FIG. 3D shows the network of FIG. 3A after the SRCGs 50,52 and the SRNG 54 identified in FIG. 3B have been transformed using the above-discussed link transformation and the above discussed node transformation respectively where all links are bi-directional except links having specified directions with arrowheads.

e) Determine Non-Primary Path to be Best Path Through This Modified (Virtual) Topology;

Once again, the details of the determination of a particular path through a network topology are beyond the scope of this invention. Any suitable method may be used. The same method is employed as was used in execution of step c) above.

For the transformed topology of FIG. 3C, the best non-primary path through the network consisting of links AE, EZ is identified.

f) Examine the Primary and Non-Primary Paths to Determine Necessary and Unnecessary Common Links—Path Coalescence.

For the purpose of determining necessary and unnecessary common links, the "direction" of a link is defined to be links direction from the source to the destination. In the event the primary and non-primary paths share a common link in the same direction, such a link is a necessary common link. In the event the primary and non-primary paths share a common link, but in opposite directions, such a link is an unnecessary link which can be removed. In a preferred embodiment, this is achieved by forming a set consisting of all the links in both the primary and non-primary paths, and removing the common opposite direction links. Then, a first path is formed by identifying in the set a first link from the source node to an intermediate node and removing the first link from the set; identifying a second link in the set from the intermediate node to another intermediate node and removing the second link from the set; and so on until a path to the destination is identified. Then the remaining links will form a second path from the source to the destination. In the event there is one or more necessary common links, the primary path may be selected as the combination of lower cost path segments (a path segment being one or more links required to bridge together two common links, or a source or destination and a common link) together with the common links, and the non-primary path may be selected as the combination of the higher cost path segments.

Referring now to our example network, there are no common links between the primary and non-primary paths. Thus, the primary and non-primary paths thus identified do not need to be changed.

Routing with Shared Risk Group Constraints while Maximizing Node and/or Edge Disjointness In another embodiment of the invention, the transformation performed in step d) above is performed in a manner which also encourages maximal edge and/or node disjointness between the primary and non-primary paths. In this embodiment, the nodes and links of any SRG under consideration are transformed as before assuming the SRG includes a resource in the primary path. Also, all of the links of the primary path are transformed for maximal edge disjointness, and/or all of the intermediate nodes (nodes other than the source and destination) in the primary path are transformed for maximal node disjointness. The SRG costs are applied, but also, additional edge disjointness and/or node disjointness costs are applied.

Figure 5A:
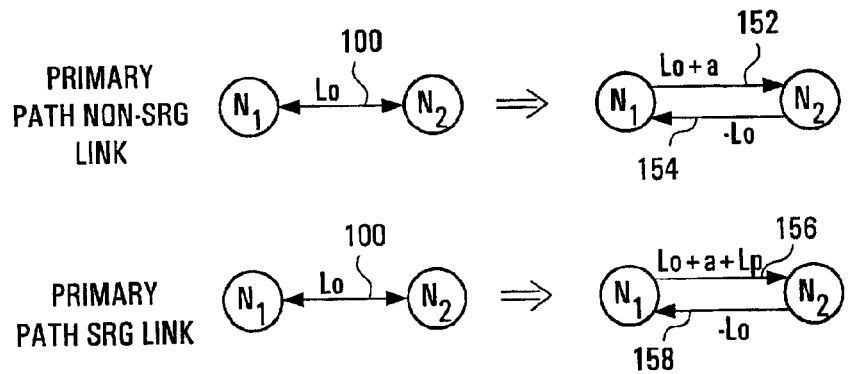
FIGS. 5A and 5B provide a summary of node and link transformations for shared risk group constraints and link/node disjointness, provided by an embodiment of the invention.

The edge-disjointness/node disjointness only has an effect on primary path links and nodes. Referring now to FIG. 5A, the transformations of a primary path link for edge-disjointness will be described. For a primary path bidirectional link 100 having cost Lo which is not part of an SRG, a transformation to a pair of unidirectional links L' 152, L" 154 is made. The forward unidirectional link L' 152 has a cost Lo+a and the reverse unidirectional link L" 154 has a cost of −Lo. For a primary path unidirectional link 100 having cost Lo which is part of an SRG, a transformation to a pair of unidirectional links L' 156, L" 158 is made. The forward unidirectional link L' 156 has a cost Lo+a+Lp and the reverse unidirectional link L" 154 has a cost of −Lo.

In the above, "a" is a quantity added to encourage edge disjointness, and may be set for example to Slinkcosts*4. The reverse primary path link L" is a negative arc, assigned a cost of (−1)*(original cost). These changes in the costs/additional links and costs are assigned to encourage edge disjointness.

Figure 5B:
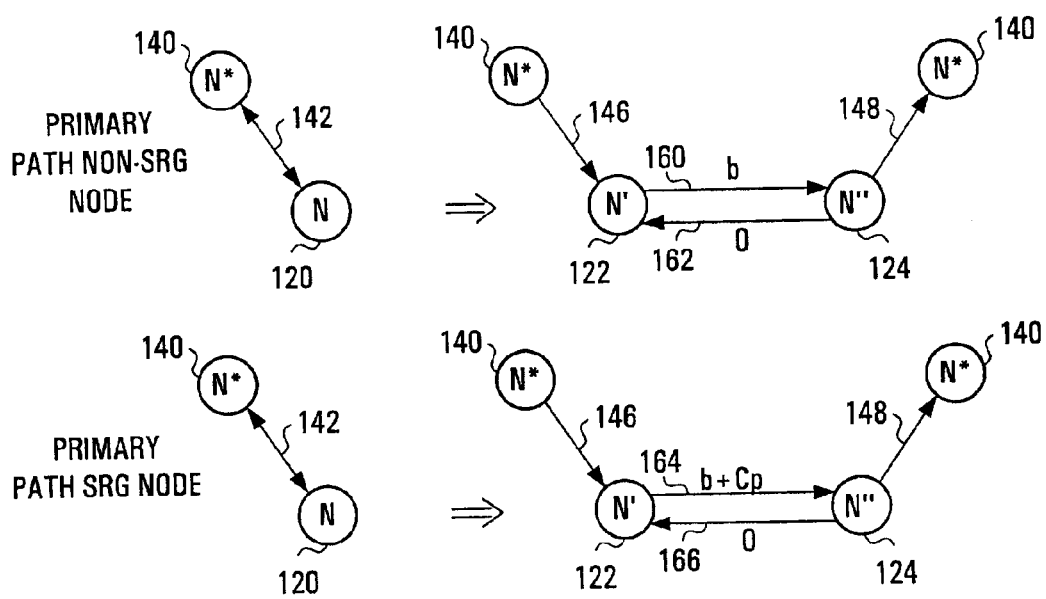

Referring now to FIG. 5B, the node disjoint transformation for a non-SRG primary path node N 120 splits the node N 120 into a pair of nodes 122,124 as before, but in this case, two unidirectional links 160,162 are added, the forward link 162 being assigned a cost of b, and the reverse link 162 being assigned a cost of zero. As indicated previously, the node disjoint transformation has no effect on non-primary path nodes. For a primary path node which is also an SRG node, two unidirectional links 164,166 between nodes 122, 124 are added, with the forward link 164 being assigned a cost of b+Cp, and the reverse link 166 being assigned a cost of zero. In the above, b is a quantity added to encourage node disjointness, and might for example be set to 4*Slinkcosts.

The remainder of the steps of the path identification are the same as discussed previously with reference the flowchart of FIG. 2.

Depending on the values of a, b, SRNG, and SRLG, the algorithm can be made to favour edge disjointness, node disjointness, SRLG, or SRNG.

Figure 6A:
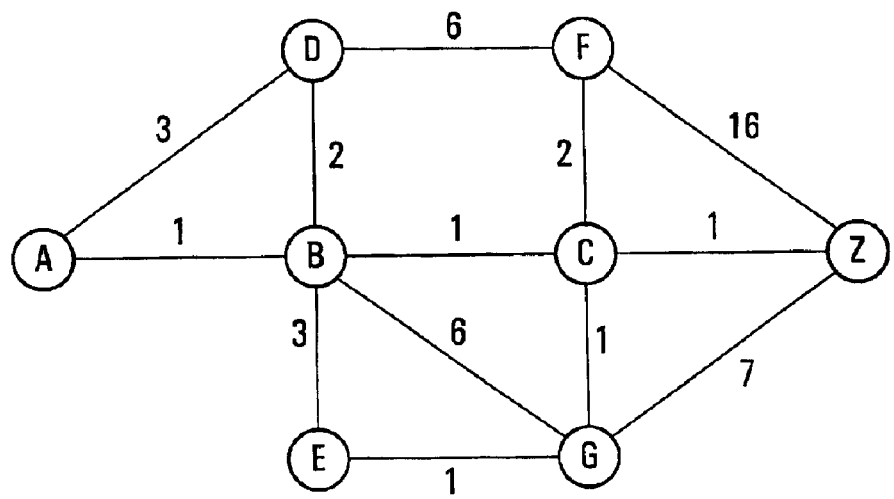
FIGS. 6A–6E are network topologies illustrating the use of the method of FIG. 2 for shared risk group and maximally node/link disjoint constraint based routing.

Another detailed example will now be presented with reference to FIGS. 6A–6D. FIG. 6A is an example network topology showing eight nodes A, B, C, D, E, F, G and Z interconnected with various links each having an associated cost.

Figure 6B:
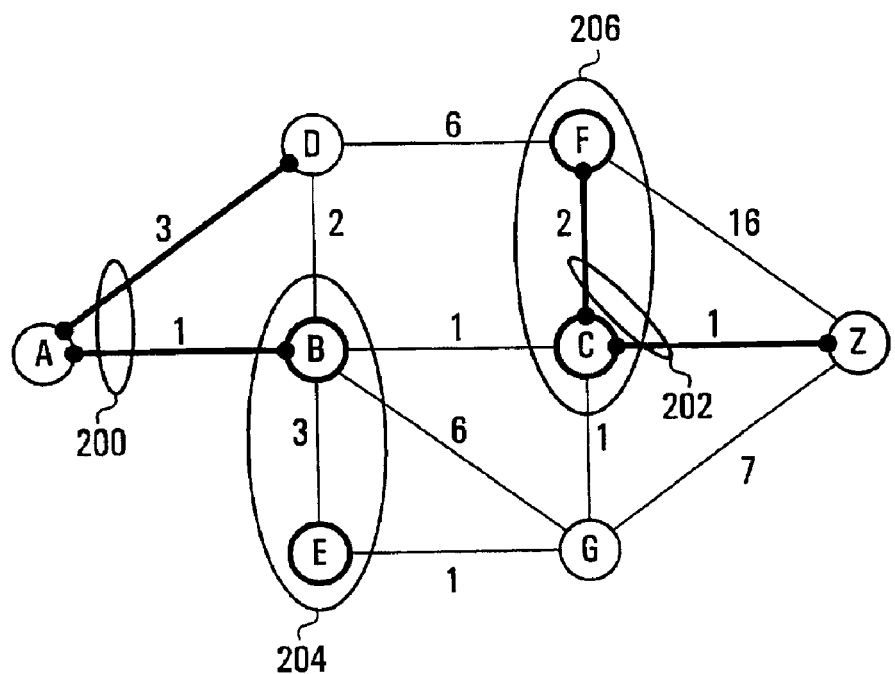

FIG. 6B shows the network topology of FIG. 6B, with several shared risk groups. A first shared risk conduit group 200 consists of links AD and AB. A second shared risk conduit group 202 consists of links CF and CZ. A first shared risk node group 204 consists of nodes B and E, and a second shared risk node group 206 consists of nodes C and F.

Figure 6C:
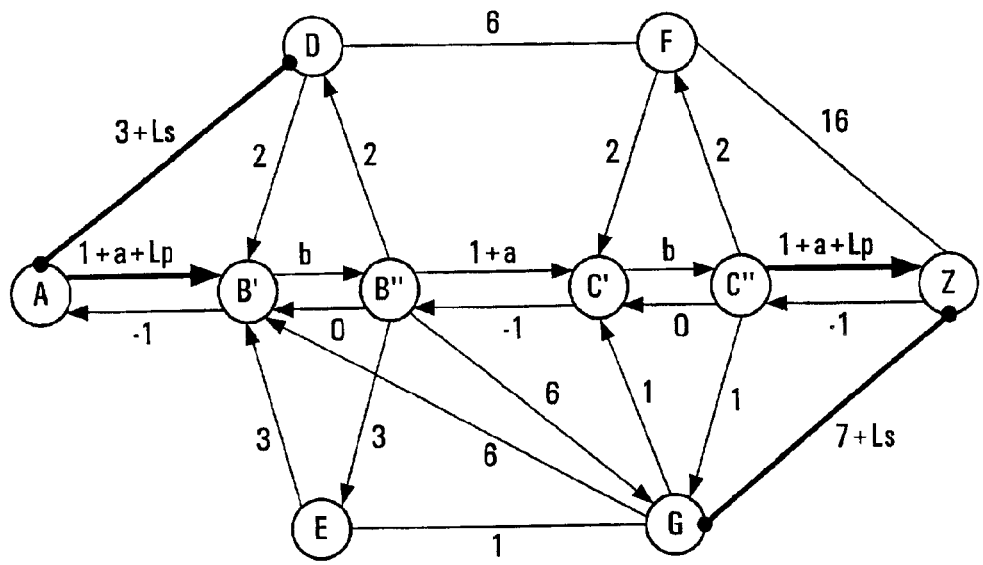
Figure 6D:
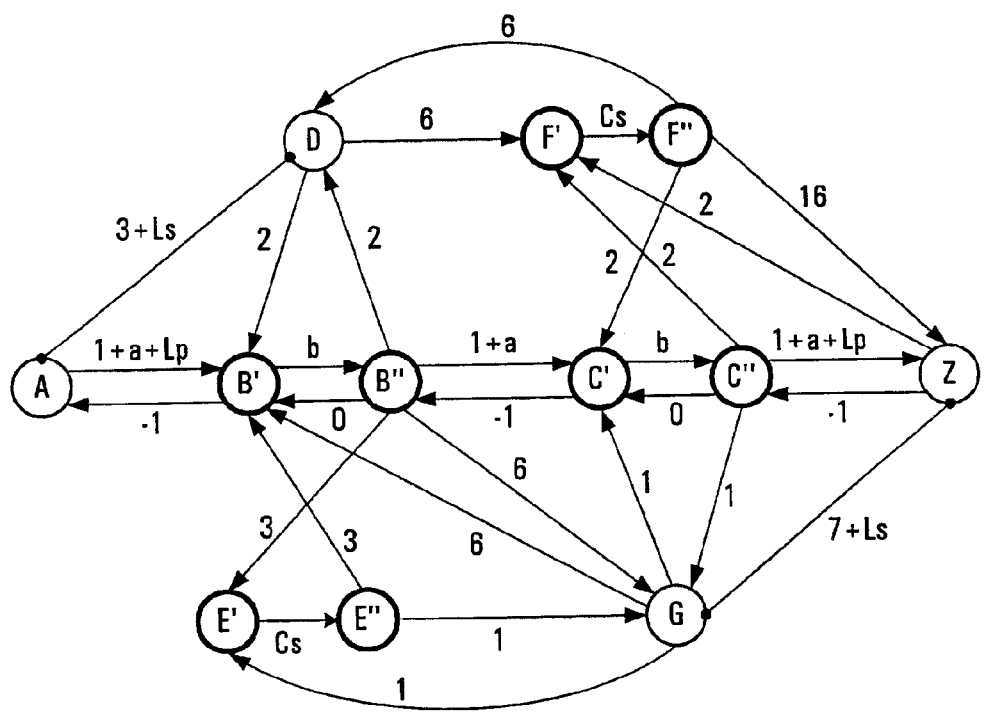
Figure 6E:
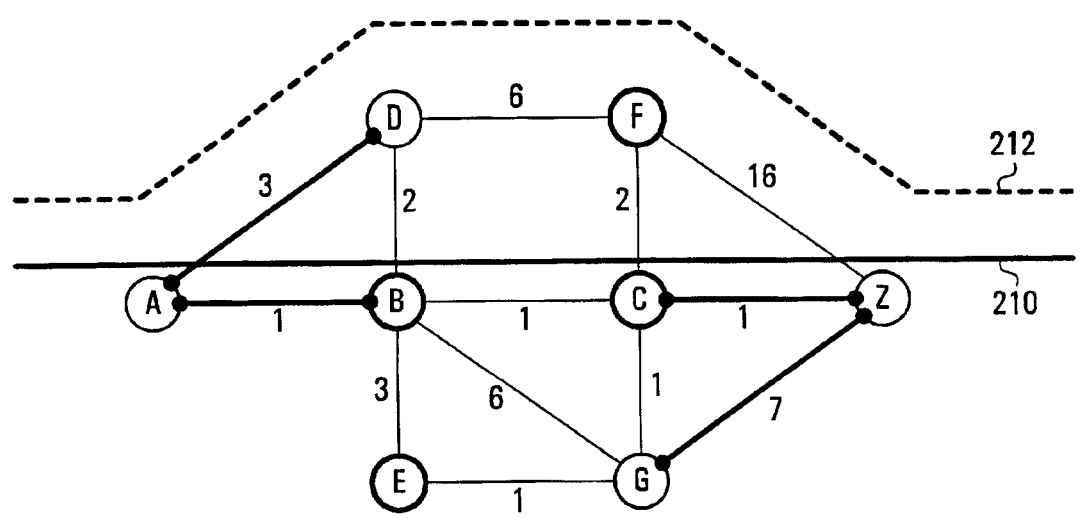

FIG. 6C shows the network topology of FIG. 6B, after having been transformed taking into account the shared risk link groups, and maximal node and link disjointness. FIG. 6D shows the network topology of FIG. 6B, after having been transformed taking into account the shared risk node groups, and maximal node and link disjointness. As indicated previously, the identification of paths through the transformed topology is done using any known method. FIG. 6E shows the resulting primary path 210 and the resulting non-primary path 212. In this case, it is not possible to avoid using the resources of the shared risk conduit group 200.

Numerous modifications and variations of the present invention are possible in light of the above teachings. It is therefore to be understood that within the scope of the appended claims, the invention may be practised otherwise than as specifically described herein.

For example, where specific link costs have been assigned in the above described examples, it is to be understood that other costs may alternatively be used, so long as they encourage the required goal(s), this being any combination of SRG disjointness, edge/node disjointness.

We claim:

1. A method of selecting multiple paths through a network represented by a network topology representing an interconnected set of network resources, the method comprising:
    a) identifying a first path through the network topology from a source node to a destination node, the first path comprising a first sequence of network resources;
    b) for at least one shared risk group, determining if any of the at least one shared risk group includes any of the first sequence of network resources, a shared risk group being a group of network resources within the network topology which have a shared risk;
    c) performing a SRG (shared risk group) topology transformation of the network topology into a virtual topology which discourages the use of network resources in any shared risk group determined in step b);
    d) identifying a second path through the virtual topology from the source node to the destination node, the second path comprising a second sequence of network resources.

2. A method according to claim 1 wherein the network resources comprise nodes and links.

3. A method according to claim 1 wherein each said at least one shared risk group comprises a respective group of nodes.

4. A method according to claim 3 wherein performing the SRG topology transformation on the network topology comprises, for each node requiring SRG transformation:
    transforming the node requiring transformation into two interconnected nodes;
    providing a forward unidirectional link between the two interconnected nodes, and assigning the forward unidirectional link a cost;
    transforming any bi-directional link into the node requiring transformation into a first unidirectional link into one of the two interconnected nodes, and a second unidirectional link out of the other of the two interconnected nodes.

5. A method according to claim 4 wherein the cost assigned to each forward unidirectional link is greater than a sum of costs for all links in the network topology.

6. A method according to claim 4 further comprising performing a ND (node-disjointness) transformation of every node in the first path other than the source node and the destination node.

7. A method according to claim 6 wherein the ND transformation of a node which has not been SRG transformed comprises transforming the node into a respective interconnected pair of nodes, and providing for each such pair of nodes a respective forward unidirectional link and a respective reverse unidirectional link between the pair of nodes, the forward unidirectional link being assigned a cost to encourage node disjointness.

8. A method according to claim 7 wherein each said respective reverse unidirectional link is assigned a cost of zero.

9. A method according to claim 7 wherein the ND transformation of a node which has been SRG transformed comprises providing a zero-cost reverse unidirectional link between the pair of interconnected nodes into which the node was SRG transformed, and increasing a cost assigned to the forward unidirectional link between the pair of interconnected costs to encourage node disjointness.

10. A method according to claim 1 wherein each said at least one shared risk group comprises a respective group of links.

11. A method according to claim 10 wherein performing a SRG topology transformation on the network topology comprises:
    for each link requiring transformation, transforming the link requiring transformation into a forward unidirectional link and a reverse unidirectional link each having a respective cost.

12. A method according to claim 11 wherein for each unidirectional link, a respective cost is assigned which is larger than a sum of the costs assigned to all links in the topology.

13. A method according to claim 12 wherein a larger cost is assigned to unidirectional links which form part of the first path than for forward unidirectional links which do not form part of the first path.

14. A method according to claim 11 wherein an additional cost is added to each forward unidirectional link which forms part of the first path, and wherein a cost assigned to each reverse unidirectional link which forms part of the first path is equal to negative the original cost for the link, so as to encourage edge disjointness.

15. A method according to claim 14 wherein the cost assigned to each reverse unidirectional link which does not form part of the first path is equal to that assigned to the corresponding forward unidirectional link.

16. A method according to claim 14 wherein the cost assigned to each forward unidirectional link is equal to the original cost plus a first constant value if the forward link is part of the first path, plus a second constant if the forward link is part of a shared risk group determined in step b).

17. A method according to claim 11 wherein the cost assigned to each forward unidirectional link is greater than a sum of costs for all links in the network topology.

18. A method according to claim 2 the shared risk groups comprises at least one shared risk group of nodes, and at least one shared risk group of links.

19. A method according to claim 18 wherein performing a topological transformation on the network topology comprises:

a) for each node requiring SRG transformation:

transforming the node requiring transformation into two interconnected nodes;

providing a forward unidirectional link between the two interconnected nodes, and assigning the forward unidirectional link a cost;

transforming any bi-directional link into the node requiring transformation into a first unidirectional link into one of the two interconnected nodes, and a second unidirectional link out of the other of the two interconnected nodes;

b) for each link requiring SRG transformation:

increasing a cost associated with the link requiring transformation by a first amount if the link requiring transformation is part of the first path, and by a second smaller amount if the link requiring transformation is not part of the first path.

20. A method according to claim 1 further comprising:

identifying if there are any unnecessary shared links between the first and second path;

in the event there are unnecessary shared links between the first and second paths, performing a path coalescence to eliminate the unnecessary shared links.

21. A method according to claim 20 wherein performing a path coalescence to eliminate the unnecessary shared links comprises:

forming a set containing all links of the first and second path;

forming a new first path by selecting a link from the set starting at the source node and ending at a subsequent node;

for a sequence of subsequent nodes, selecting a link from the set starting at the subsequent node and ending at another subsequent node, until the another subsequent node is the destination node;

forming a new second path from links in the set remaining after the formation of the first path.

22. A method according to claim 1 further comprising:

in the event at least two paths cannot be found which do not share at least one resource having shared risks, revising the at least one shared risk group to be less restrictive and then re-executing steps b) through d).

23. A method according to claim 22 further comprising:

defining a hierarchy of resources, the hierarchy having a plurality of levels, with resources assigned to a given level in the hierarchy being contained by a resource assigned to a higher level in the hierarchy, wherein a shared risk between any two resources in a lower level of the hierarchy is also considered a shared risk between any pair of resources in a higher level of the hierarchy which contain the two resources of the lower level of the hierarchy;

wherein a first attempt is made to define first and second paths which do not share any risk at the highest level of the hierarchy of resources;

upon failure of the first attempt, at least one subsequent attempt is made to define first and second paths which do not share any risk at a level of the hierarchy of resources below the highest level of the hierarchy of resources.

24. A method according to claim 23 wherein subsequent attempts are made for respective lower levels of the hierarchy of resources until first and second paths are identified which do not share risk at the respective lower level.

25. A method according to claim 1 further comprising:

while transforming the network topology, performing further transformations which encourage the selection of the first and second path in a maximally edge disjoint manner.

26. A method according to claim 1 further comprising:

while transforming the network topology, performing further transformations which encourage the selection of the first and second path in a maximally node disjoint manner.

27. A method according to claim 1 wherein the shared risk groups include at least one group selected from: shared risk captive office group, shared risk node group, shared risk link card group, shared risk trench group, shared risk conduit group, shared risk fiber group.

28. A method according to claim 23 further comprising:

defining a first hierarchy comprising a first level which is line cards, a second level which is nodes, and a third level which is captive offices;

defining a second hierarchy comprising a first level which is fibers, a second level which is conduits and a third level which is trenches.

29. A processing platform-readable medium having code means stored thereon for instructing a processing platform to select multiple paths through a network represented by a network topology representing an interconnected set of network resources, the medium comprising:

first code means for identifying a first path through the network topology from a source node to a destination node, the first path comprising a first sequence of network resources;

second code means adapted to, for at least one shared risk group, determine if any of the at least one shared risk group includes any of the first sequence of network resources, a shared risk group being a group of network resources within the network topology which have a shared risk;

third code means for performing a SRG (shared risk group) topology transformation of the network topology into a virtual topology which discourages the use of network resources in any shared risk group determined by the second code means;

fourth code means adapted to identify a second path through the virtual topology from the source node to the destination node, the second path comprising a second sequence of network resources.

30. A network management platform comprising:

means for maintaining or obtaining network topology information;

means for identifying a first path through the network topology from a source node to a destination node, the first path comprising a first sequence of network resources;

means adapted to, for at least one shared risk group, determine if any of the at least one shared risk group includes any of the first sequence of network resources, a shared risk group being a group of network resources within the network topology which have a shared risk;

means for performing a SRG (shared risk group) topology transformation of the network topology into a virtual topology which discourages the use of network resources in any shared risk group determined by the second code means;

means adapted to identify a second path through the virtual topology from the source node to the destination node, the second path comprising a second sequence of network resources.

* * * * *